US006331687B1

(12) United States Patent
Dunk et al.

(10) Patent No.: US 6,331,687 B1
(45) Date of Patent: Dec. 18, 2001

(54) CONTROL METHOD AND DEVICE FOR A SWITCHGEAR ACTUATOR

(75) Inventors: Michael P. Dunk, Caledonia, WI (US); Garrett P. McCormick, Carlisle, PA (US); John F. Baranowski, Franklin, WI (US)

(73) Assignee: Cooper Industries Inc., Houston, TX (US)

( * ) Notice: Subject to any disclaimer, the term of this patent is extended or adjusted under 35 U.S.C. 154(b) by 0 days.

(21) Appl. No.: 08/945,384

(22) PCT Filed: May 15, 1996

(86) PCT No.: PCT/US96/07114

§ 371 Date: Sep. 23, 1998

§ 102(e) Date: Sep. 23, 1998

(87) PCT Pub. No.: WO96/36982

PCT Pub. Date: Nov. 21, 1996

Related U.S. Application Data

(63) Continuation-in-part of application No. 08/440,783, filed on May 15, 1995, now abandoned.

(51) Int. Cl.[7] .......................... H01H 33/66; H01H 33/59; H01H 75/00; H02H 3/08

(52) U.S. Cl. .............................. 218/140; 218/22; 218/23; 218/26; 218/154; 335/151; 361/45; 361/98; 318/115; 318/135

(58) Field of Search ................................ 218/22–28, 118, 218/140, 154; 335/2, 6, 38, 41, 121, 151, 170, 174, 180, 185, 187, 195, 201; 307/117, 139, 132 R; 310/12, 90.5; 318/115, 135; 324/76.58, 500; 341/123; 361/45, 98, 97, 79, 115, 135

(56) References Cited

U.S. PATENT DOCUMENTS

Re. 30,134 10/1979 McClain et al. ....................... 361/76

(List continued on next page.)

FOREIGN PATENT DOCUMENTS 2601799 7/1977 (DE) .............................. H01H/47/32
32 24 165 12/1983 (DE) ................................ H01H/3/28
0528357 2/1993 (EP) .............................. H01H/47/32

(List continued on next page.)

OTHER PUBLICATIONS

Basics of Voice Coil Actuators PCIM; Power Conversion Intelligent Motion; (Jul. 1993) pp. 44–46.

(List continued on next page.)

*Primary Examiner*—Michael Friedhofer
(74) *Attorney, Agent, or Firm*—Fish & Richardson PC

(57) ABSTRACT

A current interrupter (4) includes a current interrupting device (4) having at least one movable contact (71); an actuator (8) coupled to the movable contact (71) of the current interrupter (4); a feedback sensor (14) for monitoring movement of the actuator (8); and a control system (12) coupled to the feedback sensor (14) so as to receive information from the feedback sensor (14) concerning the movement of the actuator (8) and for controlling movement of the actuator (8) based on the information. The interrupter (4) further includes a memory (202) for storing a desired motion profile of the actuator (8); and a microprocessor (202) for comparing the movement of the actuator (8) with the desired motion profile and controlling movement of the actuator (8) based also on a comparison of the movement of the actuator (8) with the desired motion profile. The interrupter (4) further includes a sensor (204) for sensing a waveform of a voltage in a line to be interrupted and providing information concerning the voltage waveform to the control system (12); wherein the control system (12) controls the movement of the actuator (8) based also on the information concerning the voltage waveform.

19 Claims, 9 Drawing Sheets

U.S. PATENT DOCUMENTS

| | | | | |
|---|---|---|---|---|
| 3,562,682 | | 2/1971 | Ohwada et al. | 335/201 |
| 3,792,390 | | 2/1974 | Boyd | 335/229 |
| 3,917,987 | | 11/1975 | Inoue | 318/135 |
| 3,946,277 | | 3/1976 | Lange et al. | 317/11 A |
| 4,027,203 | | 5/1977 | Moran et al. | 361/98 |
| 4,124,790 | | 11/1978 | Kumbera et al. | 200/144 B |
| 4,247,879 | | 1/1981 | Elms et al. | 361/45 |
| 4,351,012 | | 9/1982 | Elms et al. | 361/96 |
| 4,387,280 | | 6/1983 | Iman | 200/82 R |
| 4,429,197 | | 1/1984 | Sakuma et al. | 200/144 B |
| 4,434,450 | | 2/1984 | Gareis | 361/152 |
| 4,535,409 | | 8/1985 | Jindrick et al. | 364/481 |
| 4,568,804 | | 2/1986 | Luehring | 200/144 B |
| 4,625,189 | | 11/1986 | Lazar et al. | 335/10 |
| 4,725,799 | | 2/1988 | Bratkowski et al. | 335/14 |
| 4,745,515 | | 5/1988 | Fowler | 361/185 |
| 4,791,394 | | 12/1988 | Mikulecky | 335/174 |
| 4,855,862 | | 8/1989 | Wainio et al. | 361/72 |
| 4,945,256 | * | 7/1990 | Tada et al. | 307/139 |
| 5,008,516 | | 4/1991 | Holling | 219/519 |
| 5,053,911 | | 10/1991 | Kopec et al. | 361/154 |
| 5,055,962 | | 10/1991 | Peterson et al. | 361/187 |
| 5,099,382 | | 3/1992 | Eppinger | 361/115 |
| 5,103,364 | | 4/1992 | Kamp | 361/72 |
| 5,128,825 | | 7/1992 | Hurley et al. | 361/154 |
| 5,175,403 | | 12/1992 | Hamm et al. | 200/144 B |
| 5,255,152 | | 10/1993 | Estes, III et al. | 361/160 |
| 5,321,762 | | 6/1994 | Stuart | 381/199 |
| 5,361,184 | | 11/1994 | El-Sharkawi et al. | 361/93 |
| 5,539,608 | | 7/1996 | Hurley et al. | 361/152 |
| 5,566,041 | * | 10/1996 | Rumfield | 361/115 |
| 5,627,718 | * | 5/1997 | Engel et al. | 361/97 |
| 5,638,296 | | 6/1997 | Johnson et al. | 364/492 |
| 5,652,691 | | 7/1997 | Fowler | 361/155 |
| 5,673,165 | | 9/1997 | Kühn et al. | 361/154 |

FOREIGN PATENT DOCUMENTS

| | | | |
|---|---|---|---|
| 2 488 036 | 2/1982 | (FR) | H01F/7/18 |
| 58-90139 | 5/1983 | (JP) | G01M/3/32 |
| WO 92 01303 | 1/1992 | (WO) | H01H/33/59 |
| WO 9323760 | 11/1993 | (WO) | G01R/31/02 |
| WO 95 28025 | 10/1995 | (WO) | H02J/5/00 |
| WO 96 36982 | 11/1996 | (WO) | H01H/33/66 |

OTHER PUBLICATIONS

Douglas Passey et al.; "Arc Suppression of a DC Energized Contactor Under Inductive Load"; *IEEE Transactions On Industry Applications*, vol. 1A–21, No. 6; Nov./Dec. 1985; pp. 1354–1328.

Request for Tender, Specification No. C54/92, entitled "12kV 3 phase pole mounted remotely controllable switchgear", closing date Jul. 22, 1992, issued and made available to the public in Australia by the South East Queensland Electricity Board (SEQEB) of 150 Charlotte Street, Brisbane Queensland 4000, as advertised in the Courier Mail newspaper on or about Wednesday Jun. 17, 1992 or Jun. 24, 1992.

"Technical Manual of N12, N24 and N36 Pole Mounted Circuited Breaker", Part No. N00–100, 1993 first published on or about Nov. 1993 by NU–LEC.

EP 96915870, Search report (Feb. 24, 1999).

* cited by examiner

CONTROL METHOD AND DEVICE FOR A SWITCHGEAR ACTUATOR

CROSS-REFERENCE TO RELATED APPLICATIONS

The present application is a continuation-in-part of U.S. patent application, Ser. No. 08/440,783, filed on May 15, 1995, now abondoned.

BACKGROUND OF THE INVENTION

1. Field of the Invention

The present invention relates to a method and device for controlling electrical switchgear. More particularly, the invention relates to a method and device for controlling a switchgear utilizing a voice coil actuator to rapidly and positively open and close a current interrupter.

2. Description of Related Art

In a power distribution system, switchgear may be incorporated into the system for a number of reasons, such as to provide automatic protection in response to abnormal load conditions or to permit opening and closing of sections of the system. Various types of switchgear include a switch for deliberately opening and closing a power transmission line, such as a line to a capacitor bank; a fault interrupter for automatically opening a line upon the detection of a fault; and a recloser which, upon the detection of a fault, opens and closes rapidly a predetermined number of times until either the fault clears or the recloser locks in an open position.

Vacuum interrupters have been widely employed in the art because they provide fast, low energy arc interruption with long contact life, low mechanical stress and a high degree of operating safety. In a vacuum interrupter the contacts are sealed in a vacuum enclosure. One of the contacts is a moveable contact having an operating member extending through a vacuum seal in the enclosure.

SUMMARY AND OBJECTS

One of the objects of the present invention is to provide a switchgear actuator mechanism and control therefore that minimizes arcing and generated transients during opening and closing.

Another object of the present invention is to provide a switchgear actuator mechanism and control therefore that provides accurate monitoring of the system.

Another object of the present invention is to provide a switchgear actuator mechanism capable of a range of motion profiles, thereby eliminating the need for many types of mechanical systems.

Another object of the present invention is to provide a switchgear actuator mechanism capable of being controlled by any commercially available motor control circuitry or dedicated motion control circuitry.

Still another object of the present invention is to provide a switchgear actuator mechanism capable of procuring speeds and forces not readily achievable with prior art mechanical systems.

Still another object of the present invention is to provide an improved synchronously operating switchgear that results in a significant reduction in transients generated during the switching operation.

Generally, switchgear incorporating vacuum interrupters have utilized various spring loaded mechanisms which are connected to an operating member to positively open or close the interrupter contacts. One such device which is commonly used is the simple toggle linkage. The primary function of these mechanisms is to minimize arcing by very rapidly driving the contacts into their open or closed positions. Various applications may require the use of a number of spring loaded mechanisms with associated latches and linkages.

In order to prime these mechanical systems, either by compression or extension of the drive spring, an actuator is normally provided. These actuators can include, but are not limited to, solenoids, motors or hydraulic devices. In comparison to the inherent speed requirements of the interrupter to effectively interrupt current, these actuators are relatively slow with poor response times. For this reason they are not normally used to directly drive the interrupter contacts but are utilized to prime the fast acting spring mechanisms. The prime disadvantage of this system is that the spring driven operation does not lend itself to being easily controllable and it requires considerable engineering effort to finely adjust the mechanism's performance.

In practice, this means that many different mechanisms must be designed to accommodate the different operating requirements for switches, fault interrupters and reclosers and within each one of these switchgear classes, there are different mechanisms required depending on the application, including voltage and current requirements.

Furthermore, in view of the high voltages that are typically used in power applications, rapid and accurate movement of the interrupter contacts is desired to minimize arcing between the contacts and the generation of transients. Depending upon the application, whether it is capacitor bank switching or fault interruption, it can be determined by those skilled in the art when the most advantageous time to open or close the interrupter contact occurs. This optimum time correlates to a precise point on the voltage or current wave where current interruption or contact make would produce minimal arcing and transients. Since conventional spring driven mechanisms do not lend themselves to this degree of fine control, this invention offers a viable means to achieve point-on-wave or synchronous switching. Such synchronous operation of the interrupter is beneficial both in terms of the reduced wear on the interrupter contacts and the significant reduction in general transients experienced by the power system downstream of the switchgear unit.

A further feature of a controlled, synchronously operating switchgear unit is that the velocity at which the contacts close can be controlled. In conventional systems, the contacts are driven together in an uncontrolled fashion at very high velocity and it is possible that the contracts will bounce open a number of times before coming to rest. This bounce phenomenon is undesirable because the ensuing arcing can soften the contacts and create strong welds when the contacts finally mate.

In accordance with the present invention, a current interrupter includes a current interrupting device having at least one movable contact; an actuator coupled to the movable contact of the current interrupter; a feedback sensor for monitoring movement of the actuator; and a control system coupled to the feedback sensor so as to receive information from the feedback sensor concerning the movement of the actuator and for controlling movement of the actuator based on the information. The interrupter further includes a memory for storing a desired motion profile of the actuator; and a microprocessor for comparing the movement of the actuator with the desired motion profile and controlling movement of the actuator based also on a comparison of the movement of the actuator with the desired motion profile.

The interrupter further includes a sensor for sensing a waveform of a voltage or current in a line to be switched and providing information concerning the waveform to the control system; wherein the control system controls the movement of the actuator based also on the information concerning the waveform.

The foregoing features and advantages of the present invention will be apparent from the following more particular description of the invention. The accompany drawings, listed hereinbelow, are useful in explaining the invention.

BRIEF DESCRIPTION OF THE DRAWINGS

In the text which follows, the invention is explained with reference to illustrative embodiments, in which.

DETAILED DESCRIPTION OF THE INVENTION

For a better understanding of the invention, reference may be made to the following detailed description taken in conjunction with the accompanying drawings, wherein preferred exemplary embodiments of the present invention are illustrated and described. Each reference number is consistent throughout all of the drawings.

Figure 1:
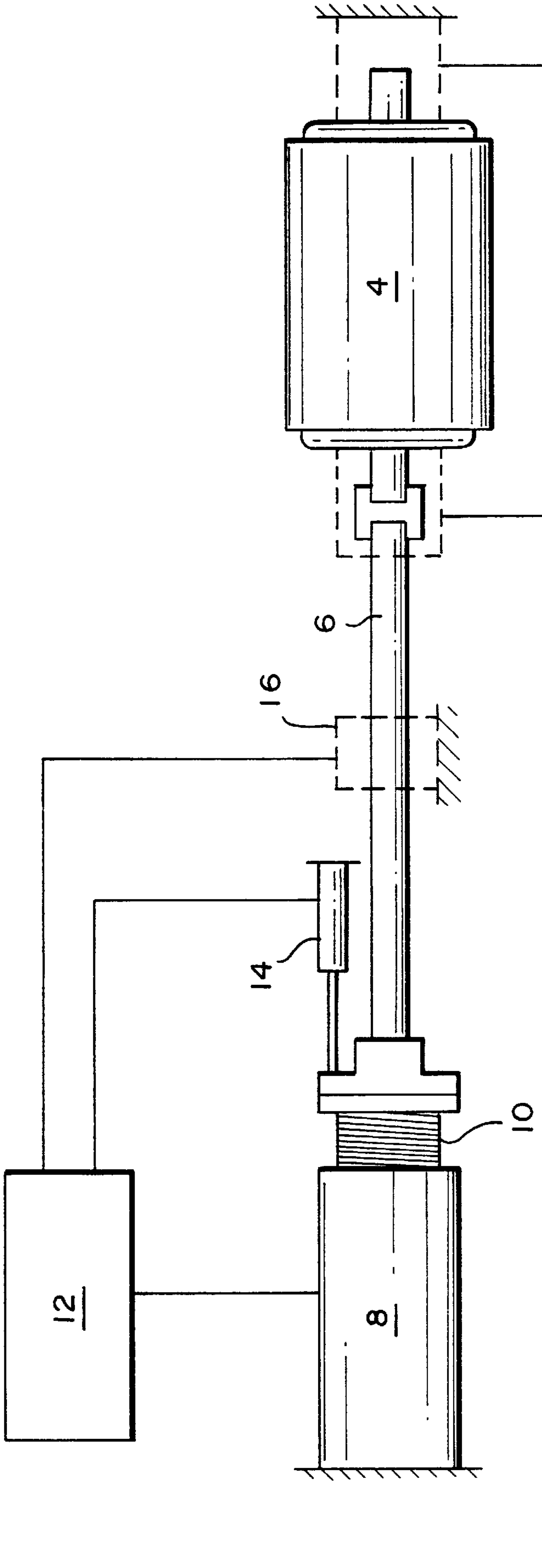
FIG. 1 shows a schematic diagram of switchgear employing a voice coil actuator.

In FIG. 1, an incoming power line 2 is coupled in series with a current interrupter 4, thereby allowing the current interrupter 4 to open the line. The line 2 may be opened upon a predetermined command or, in the case of a fault interrupter, if a fault exceeds a predetermined threshold level. One of the contacts of the current interrupter 4 is connected to one end of an operating rod 6. The other end of the operating rod 6 is operatively coupled to an actuator, such as a voice coil actuator 8. The voice coil actuator 8 directly acts upon the operating rod 6 in order to open or close the contacts of the current interrupter 4.

The voice coil actuator 8 is a direct drive, limited motion device that uses a magnetic field and a coil winding 10, to produce a force proportional to the current applied to the coil. The electromechanical conversion of the voice coil actuator 8 is governed by the Lorentz Force Principle, which states that if a current-carrying conductor is placed in a magnetic field, a force will act upon it. The magnitude of the force is determined by the equation:

$$F=kBLIN$$

where F equals force, k is a constant, B is the magnetic flux density, L is the length of the conductor, I is the current in the conductor, and N is the number of turns of the conductor.

The current passing through the voice coil winding 10 is controlled by a control mechanism 12. Any commercially available control mechanism 12 could be utilized. For example, suitable control mechanisms 12 include: single loop controllers, programmable logic controllers, or distributed control systems. The control mechanism 12 may be coupled to a feedback device 14, which provides input regarding the position of the operating rod 6.

The control mechanism 12 may also be coupled to a latching device 16. When instructed to secure the operating rod 6 by the control mechanism 12, the latching device 16 fastens the operating rod 6 in its current position. In an alternative device, the latching mechanism 16 may be a permanent magnet or mechanical latch that is not coupled to the control device 12.

Figure 2:
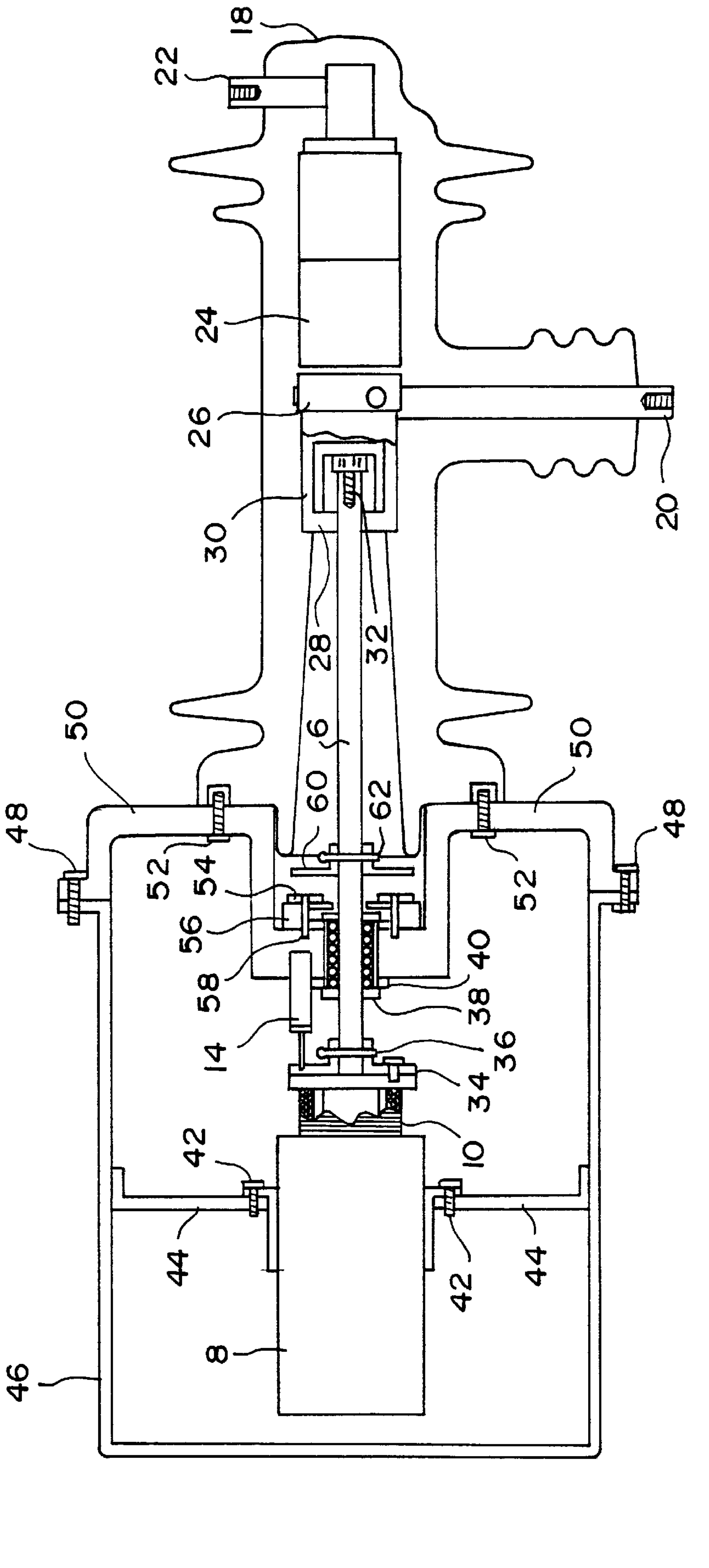
FIG. 2 shows a cross-sectional view of one embodiment of a switchgear.

In FIG. 2, a cross-sectional view of one of the embodiments of the invention is shown. A one piece, elongated, solidly insulated encapsulation 18 encloses the operating rod 6 and the current interrupter 4. The encapsulation 18 may be formed out of ceramic, porcelain, any suitable epoxy, or any other appropriate solid insulating material. A line side high voltage electrical terminal 22 and a load side high voltage electrical terminal 20 protrude through the solidly insulated enclosure 18, and are coupled to the current interrupter 4. The high voltage electrical terminals 20 and 22 are diametrically disposed, 180 degrees apart, and are parallel with respect to one another. The encapsulation 18 provides both the solid insulation between the high voltage electrical terminals 20 and 22 and the solid insulation between each high voltage electrical terminal 20 and 22 and electrical ground (not shown).

Figure 3:
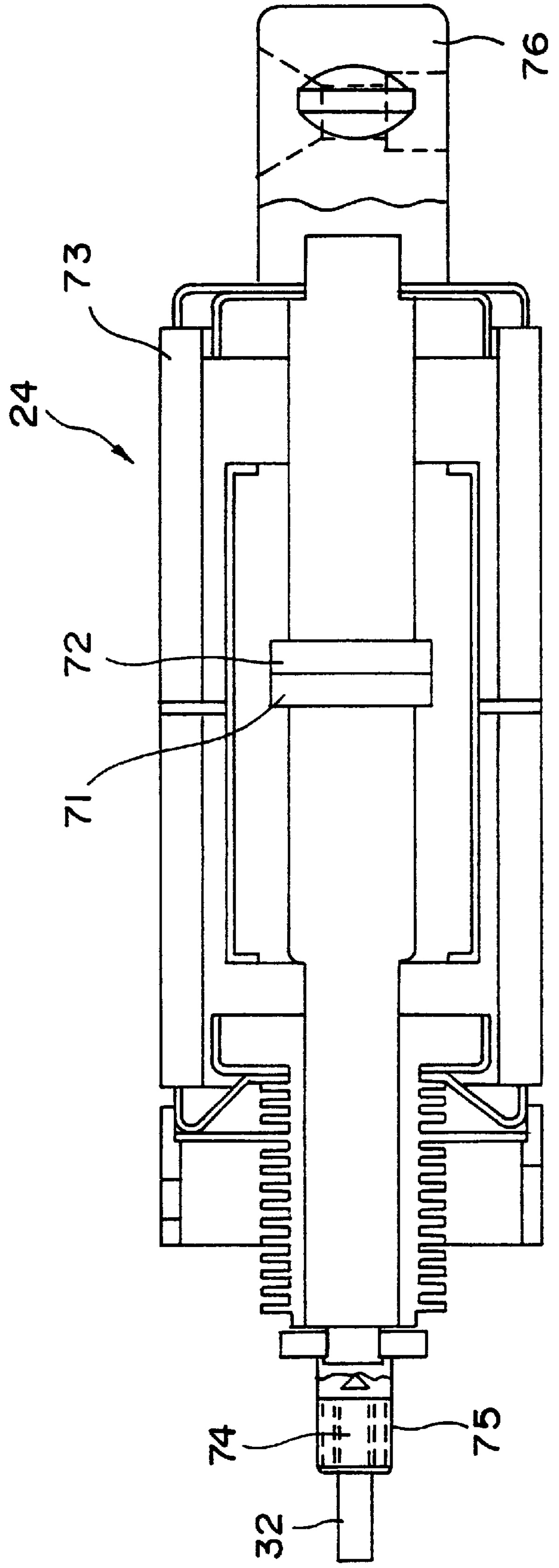
FIG. 3 is a cross-sectional view of the vacuum module shown in FIG. 2.

The current interrupter 4 includes a vacuum module or bottle 24, shown in cross section in FIG. 3, with a pair of switch contacts 71, 72 disposed within the vacuum module 24. The vacuum module 24 provides a housing and an evacuated environment for the operation of the pair of switch contacts. The module 24 is usually constructed from an elongated, generally tubular, evacuated, ceramic casing 73, preferably formed from alumina. One of the switch contacts 71 is movable, and the other switch contact 72 is stationary or fixed.

A special fitting 76 is attached to the stem of the stationary contact 72, permitting the associated high voltage electrical terminal 22 to exit at a 90° angle.

The movable switch contact 71 is fastened to the uppermost, longitudinal end of the operating rod 6. One method of fastening is to use a stud 32 threaded into a tapped connection 74 in the moving stem 75 of the movable contact 71. When the switch contacts are in the closed position as shown, a low resistance or short circuit electrical path is created between the high voltage electrical terminals 20 and 22. The current interrupter 4 further includes a current exchange assembly and an interface 26 between the vacuum module 24 and the current exchange assembly. The current exchange assembly contains a moving piston 28 and a fixed outer housing 30. In this embodiment, the operating rod 6 is made from an electrically insulated material.

The other end of the operating rod 6 is secured to a flange 34 on the voice coil actuator 8 by a rigid pin 36. The pin 36 which retains the foregoing components in position, can be secured by any suitable means, such as a pair of retaining rings. A recirculating linear ball bearing 38 and split rings 40, which hold the ball bearing, provide smooth movement of the operating rod 6. The voice coil winding 10 is disposed between the outer body of the voice coil actuator 8 and the flange 34. Side flanges 42 are attached to the outer body of the voice coil actuator 8, and connect to side brackets 44, thereby securely fastening the voice coil actuator 8 to a protective case 46. The protective case 46 is attached to a lid 50 for the protective case 46 via housing flanges 48, and the protective case lid 50 is connected to the solid insulation enclosure 18 via lid flanges 52. Just as the solid insulated encapsulation 18, the protective case 46 is also formed out of ceramic, porcelain, any suitable epoxy, or any other appropriate solid insulating material.

In this embodiment the feedback device 14 is a position sensor, such as a linear potentiometer 14. The linear potentiometer 14 can be made from a three-terminal rheostat or a resistor with one or more adjustable sliding contacts, thereby functioning as an adjustable voltage divider. The linear potentiometer 14 provides information regarding the position of the operating rod 6 to the control mechanism 12, which controls the voice coil. actuator 8. Alternatively, the feedback device 14 may be an optical encoder.

The latching device 16 is intended to secure the operating rod 6. The latching device may be a controllable device, such as an electromagnet, or a simple mechanical or permanent magnet latch including: a latching magnet 54, a spacer 56 made from nonferrous material, a bolt 58 securing the latching magnet 54 to the protective case lid 50, a latch plate 60 made from steel or iron, and a latch plate pin 62 securing the latch plate 60 to the operating rod 6.

Figure 4:
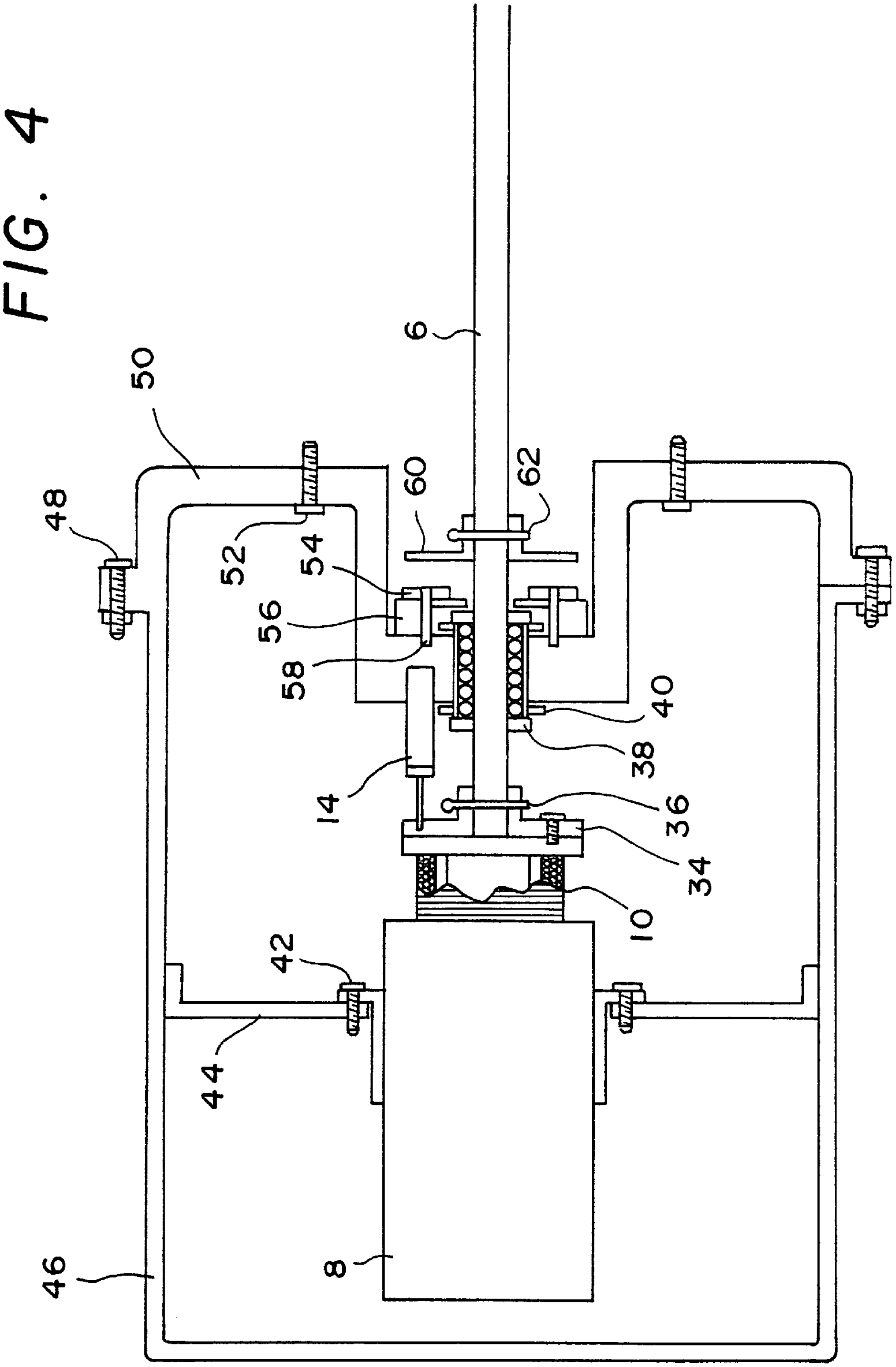
FIG. 4 shows an enlarged view of the operating mechanism of the embodiment displayed in FIG. 2.
Figure 5:
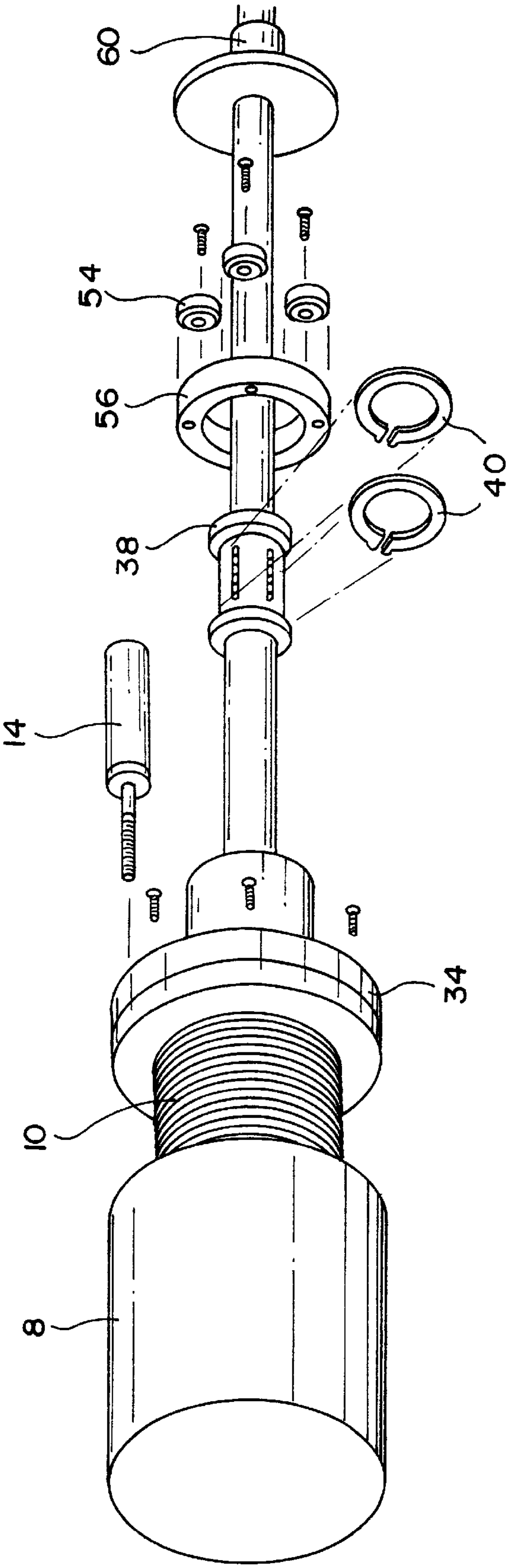
FIG. 5 shows an exploded view of the primary components of the operating mechanism.

In order to more fully understand the invention, reference may be had to FIGS. 4 and 5. FIG. 4 shows an enlarged view of the operating mechanism of the preferred embodiment displayed in FIG. 2, and FIG. 5 shows an exploded view of the primary components of the operating mechanism.

Details concerning the control mechanism of the present invention will now be described.

Figure 6:
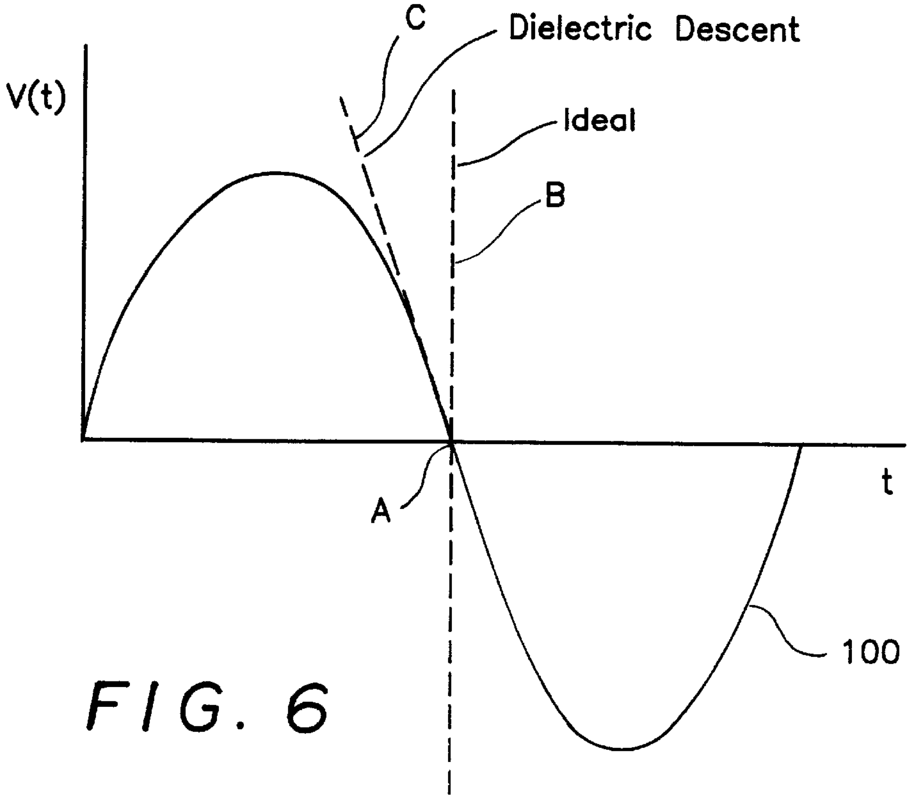
FIG. 6 shows a graph illustrating the system voltage vs. time and the dielectric descent of the interrupter.

FIG. 6 illustrates a voltage signal 100 plotted on a graph comparing the voltage level v(t) versus time t. In a 60 Hz application, each half cycle is ideally 8.33 ms. However, actual cycles may vary due to harmonics or assymetric conditions so that a given half cycle may be greater than or less than 8.33 ms.

In order to minimize arcing and the generation of transients in a capacitor switch application, the contacts of the interrupter are ideally closed instantaneously at the null points when v(t) equals zero. See point A in FIG. 6. However, since the contacts cannot close instantaneously, the timing of the initiation of the opening and closing sequences should be carefully controlled in order to minimize transients and arcing.

Figures 7, 11:
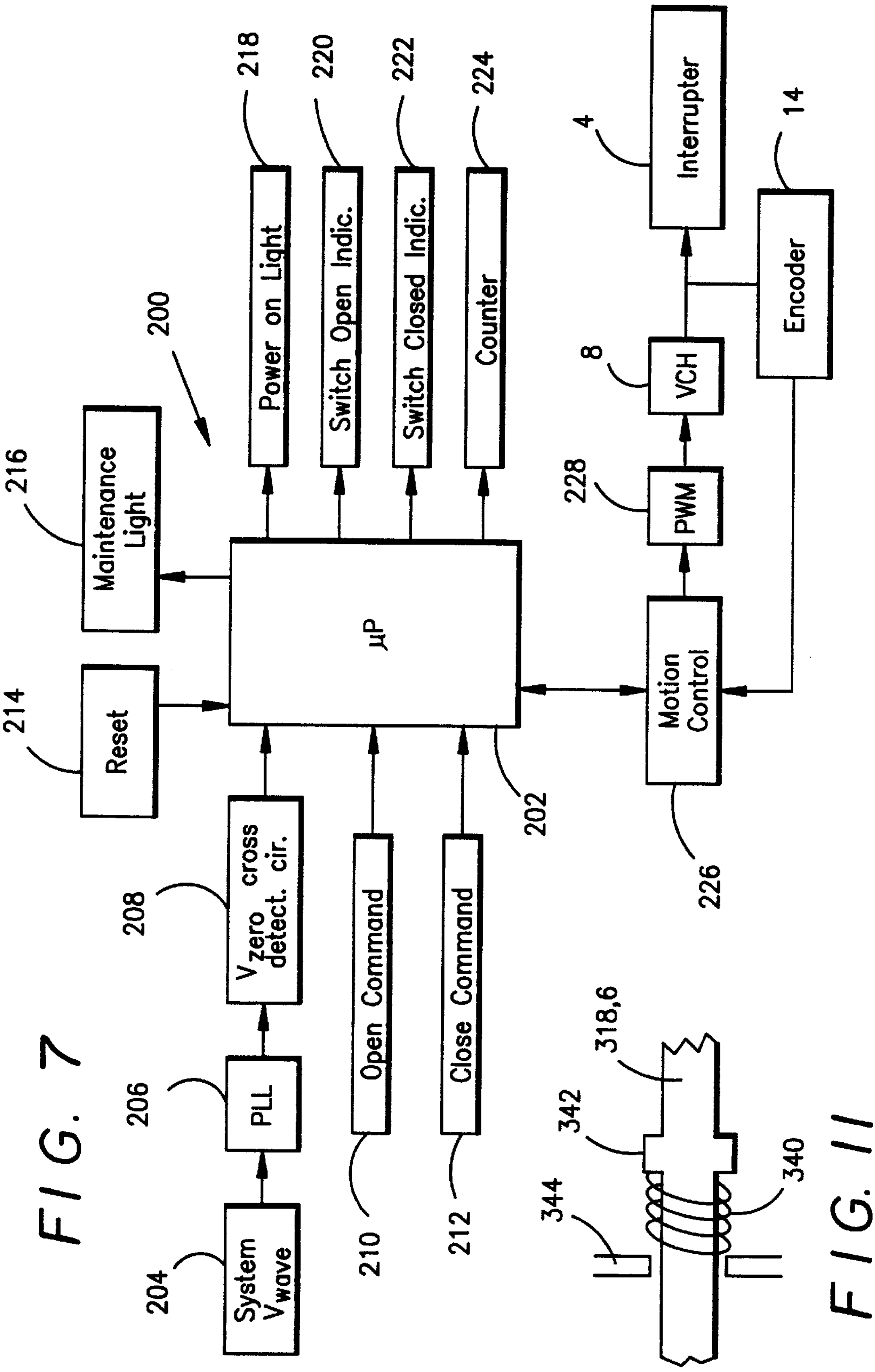
FIG. 7 is a schematic view of a circuit that may be used with the present invention.
FIG. 11 is a view of a contact pressure spring mechanism that may be used with the present invention.

A preferred embodiment of a control circuit 200 for use with the present invention is illustrated in FIG. 7. At the heart of the control circuit 200 is a microprocessor 202 that is suitable for use in a broad temperature range.

The voltage waveform of the power line being controlled by the interrupter 4 is analyzed with a voltage waveform analyzer 204, a phase lock loop circuit 206, and a $V_{zero}$ crossing detection circuit 208. Information concerning the voltage waveform of the line to be interrupted, including the timing of null points A wherein the voltage v(t) is zero, is input to the microprocessor 202. Alternatively, a voltage waveform analyzer 204 could be used that measures the voltage waveform directly off the line without the phase lock loop circuit 206.

Open and close commands are input to the microprocessor 202 via inputs 210 and 212, respectively. The open and close commands may be created manually, may be initiated at preset times by a clock, may be initiated by an external control, or may be triggered by the detection of a fault, depending on the particular application of the interrupter 4.

A reset signal 214 may be input to the microprocessor 202 to manually reset the microprocessor 202 when necessary. For example, if the interrupter 4 is manually manipulated, the microprocessor 202 may not be set to the current status of the interrupter 4. In such a situation, the microprocessor 202 should be reset.

Status indicators may be provided to indicate various conditions of the circuit 200 or the interrupter 4. Such indicators may include a maintenance light 216 to indicate when maintenance is required, a power on light 218, a switch open indicator 220, a switch closed indicator 222, and a counter 224 that may be used to count cycles or operations of the system.

A preferred embodiment of the present invention may include two control systems. A first control system is conventional, and thus not disclosed herein in detail, and determines when the line controlled by the interrupter 4 is to be opened or closed. The first control system may include a fault detector or a timer for interrupting the line upon the detection of a fault, or at a predetermined time.

Alternatively, an open or close command may be input directly to the system. The open and close commands, whether originating from the first control system or manually, are input to the microprocessor 202 at inputs 210 and 212, respectively.

The second control system 200, illustrated in FIG. 7, analyzes the voltage waveform of the line and determines the best time for initiating opening and closing the interrupter 4 in order to minimize transients and arcing.

Each interrupter 4 has a dielectric strength that defines the likelihood of an arc jumping from one contact to another. The dielectric strength depends upon a number of factors including the medium inside the interrupter 4 and the distance between the contacts 71, 72. FIG. 6 illustrates the changing or descent of the dielectric strength between the contacts 71, 72 versus time as the distance between the contacts closes. See line C in FIG. 6. Ideally, the dielectric strength between the contacts would be infinite until the exact moment of closing of the contacts 71, 72. See line B in FIG. 6. In reality, the dielectric slopes downward, reducing quickly as the contacts approach each other. See line C in FIG. 6. If the slope of the dielectric descent is sufficiently high, and the dielectric strength remains greater than the voltage of the waveform, the generation of arcing and transients is eliminated or significantly reduced.

Figure 8:
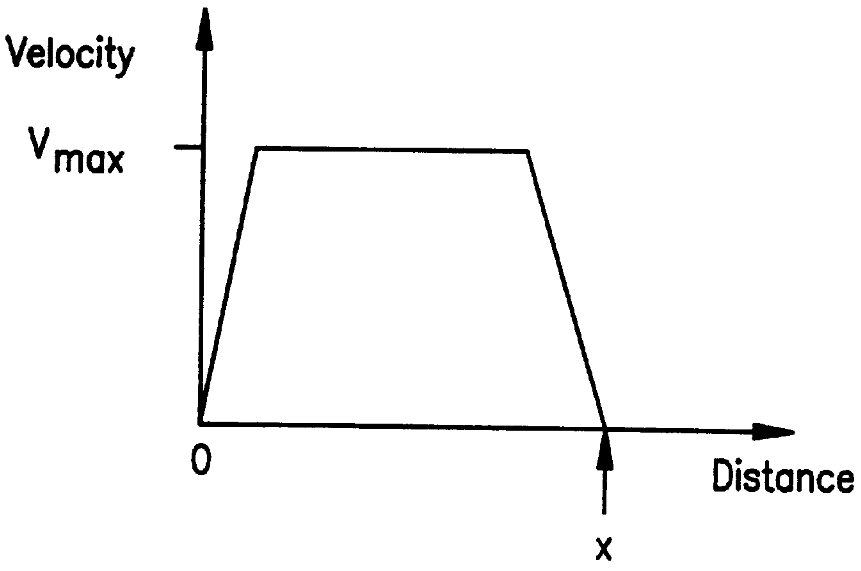
FIG. 8 is a graph illustrating a motion profile that may ,be used with the present invention.

Another factor to be considered during the operation of an interrupter is the relative velocity between the contacts upon opening and closing. If the contacts are moving slowly, the slope of the dielectric descent will be low, and arcing will likely occur. Conversely, if the contacts are moving too quickly, especially upon closing, the contacts will likely bounce off of each other, causing unnecessary arcing and transients. Accordingly, a unique ideal motion profile may exist for each application of an interrupter. FIG. 8 illustrates an example of a motion profile, wherein the abscissa represents the location of the moving contact 71 and the ordinate represents the velocity at which the contact 71 is moving. Point 0 on the abscissa represents the starting or maximum open position of the contact 71, and point x represents the closed position, wherein the contact 71 is touching the stationary contact 72. At point 0, when the close command is initiated, the velocity is zero. The velocity is increased as quickly a possible to a maximum velocity $V_{max}$. The velocity remains at $V_{max}$ for as long as possible, but is then reduced as the point of contact x approaches in order to minimize bounce.

During an opening sequence, the motion profile is also important to prevent the occurrence of restrikes or re-ignitions shortly after opening. If the contacts separate at too slow a speed, or at a time when the voltage level is too high, excessive arcing may occur. Desired motion profiles for opening and closing sequences can be determined by those of skill in the art and preprogrammed into the circuit 200.

Figure 12:
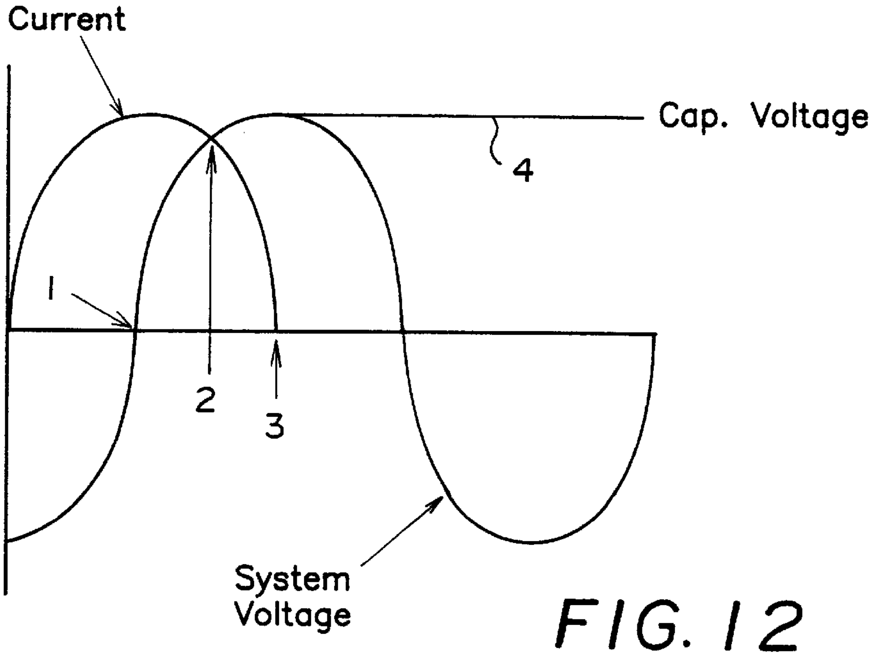
FIG. 12 is a graph illustrating the synchronous timing of an opening operation of a capacitor switch.

Turning attention to FIG. 12, the timing of the opening operation in a capacitor switching application may be better understood. FIG. 12 relates to the opening sequence of a system that includes a capacitor bank. Line 4 indicates the voltage level of the fully charged capacitors. The switch begins to open at point 2, and an arc forms. However, at this point, the current is decaying and the arc is extinguished at current zero, point 3. The system voltage is now at its peak, but the voltage across the contacts is small because of the charge on the capacitor bank, which approximates the peak system voltage. As the system voltage begins to drop, the voltage on the capacitor bank stays high, resulting in an increase in the voltage across the contacts. The contacts should part with enough acceleration so that the dielectric rises faster than the escalating voltage between the contacts in order to avoid restrikes and re-ignitions.

The motion control function can be achieved by means of software loaded into the microprocessor/microcontroller or by the addition of dedicated motion control chips which interface with the microprocessor. A particular motion profile is programmed into a memory, which may be a separate EEPROM chip in an external motion control circuit 226, or onboard memory on the microprocessor or microcontroller. The motion control circuit 226 is connected to the feedback device (encoder) 14 and to a pulse width modulation (PWM) circuit 228. The PWM 228 controls the current that is applied to the voice coil actuator 8. Since the force driving the voice coil actuator 8 is proportional to the current supplied to the voice coil actuator 8, the velocity of the actuator 6 (and the moving contact 71) is controlled by the PWM 228. As a result, the voice coil actuator 8 is controlled by a closed loop feedback system that includes the position encoder 14 that sends a position signal of the actuator 8 to the motion control circuit 226. The motion control circuit 226 compares the actual position of the actuator 8 to the ideal motion profile preprogrammed into the motion control circuit 226. Based on the comparison of the actual position to the ideal motion profile, the voice coil actuator 8 is controlled by the PWM so that its motion closely approximates the ideal intended motion.

Control of the actuator is further modified by the circuits 204, 206, 208 that monitor that actual voltage waveform of the line to be interrupted. For example, for a particular application, it may be determined that the contacts 71, 72 should open or close within 1 ms of the zero crossing A (FIG. 6) of the voltage signal v(t). The ideal motion profile preprogrammed into the motion control circuit 226 includes the total reaction and travel time of the actuator 8 from the time an initiating signal is sent to the time the contacts 71, 72 close. If the ideal motion profile indicates that the reaction and travel time for the contacts to close after the initiating signal is 7 ms, the microprocessor analyzes the actual voltage waveform of the line to be interrupted and determines a specific time between null points at which the initiating signal should be sent. The circuits 204, 206, 208 first establish the actual cycle period and the resulting length of time between zero crossings. The control circuit 200 then initiates operation of the voice coil actuator 8 at a time after a zero crossing that is equal to the actual time between null crossings minus the reaction and travel time of the actuator 8. Accordingly, if the actual voltage waveform indicates that there are 8.3 ms between zero crossings and the reaction and travel time is 7 ms, the opening sequence is initiated at 1.3 ms after a zero crossing. In an alternative embodiment, the system may assume that the actual time between zero crossings is 8.33 ms, and the initiation is calculated based on that assumption.

In some embodiments of the present invention, a plurality of motion profiles can be preprogrammed into the circuit 200, and the appropriate motion profile can be selected by an input from the operator.

Once the sequence is initiated, the actual motion of the actuator 8 is monitored by the encoder 14 and compared against the ideal motion profile. The current applied to the actuator 8 is adjusted by the PWM 228 based on the comparison of the actual movement of the actuator 8 to the ideal motion profile.

Figure 9:
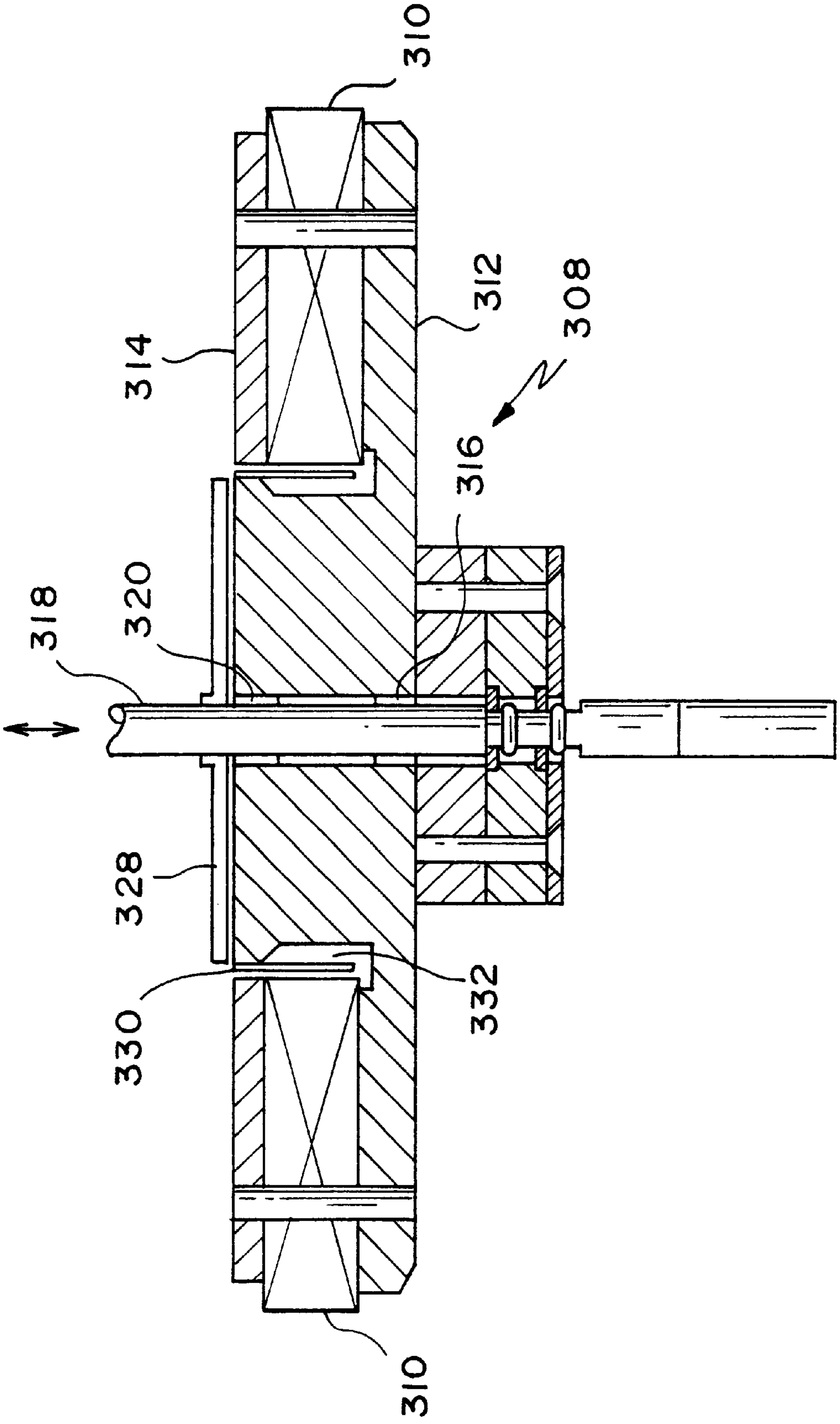
FIG. 9 is an illustration of a voice coil actuator that may be used with the present invention.

FIG. 9 illustrates another embodiment of a voice coil actuator 308 that may be used with any of the embodiments of the present invention. The voice coil actuator 308 includes a ring shaped magnet 310, which is preferably a 4 MGO ceramic magnet. The magnet 310 is housed with a bottom pole piece 312 and a top pole piece 314. These pole pieces are formed from ferromagnetic materials, such as iron or steel. The pole pieces 312, 314 include a central aperture 316 through which an operating rod 318 extends. The operating rod 318 is supported in the pole pieces 312, 314 with self-lubricating polymer bearings 320, such as IGUS™ bearings 320.

An aluminum plate 328 is fixed to the rod 318. At a peripheral edge of the plate 328, a coil 330 extends from the plate 328 into an air groove 332 formed between the bottom pole piece 312 and the magnet 310. The coil 330 may be formed from flattened wire so as to maximize the number of turns that will fit within the air groove 332.

The actuator 308 may be driven by a 24 volt battery, or any other suitable power source, including an autoranging AC to DC converter.

Figure 10:
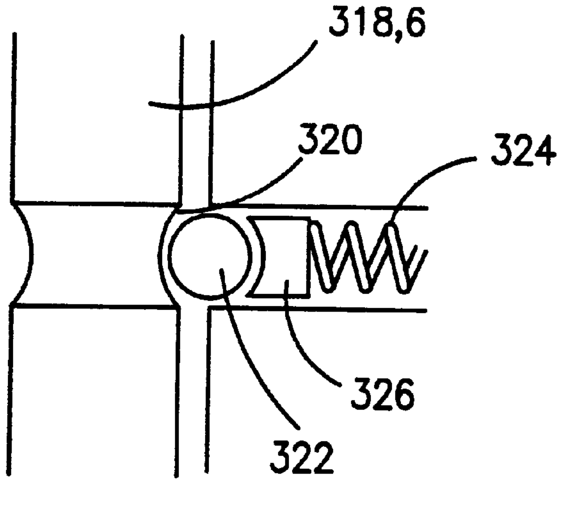
FIG. 10 is a view of a latching mechanism that may be used with the present invention.

In order to latch the device in a particular position, the operating rod 318 may include a groove 320 within which is located a ball 322. See FIG. 10. A spring 324 and cap 326 urge the ball 322 into the groove 320 to retain the rod 318 in a fixed position. The rod 318 may be freed from the ball 322 upon the application of a force, the level of which depends on the strength of the spring 324.

In order to ensure a good connection between the contacts 71, 72, a spring 340, or other force, may be applied to the rod 6 (or 318) to urge the contact 71 against the contact 72 with a predetermined force, such as 60–100 pounds. The spring may be compressed by the action of the actuator. Turning attention to FIG. 11, the operating rod 6, 318 may include a flange 342 that provides a surface against which the spring 340 presses. Another abutment surface 344 may be provided to support the opposite end of the spring 340.

The spring 340 provides the additional benefit of maintaining an adequate force between the two contacts 71, 72. For example, after repeated operations, arcing may cause the contacts to wear. Because of the spring force, the two contacts are urged against each other, even if they have become worn. In addition, the application of the force causes a reduction in the electrical resistance between the contacts in the closed position, thereby reducing heat losses.

If the contacts become worn, the operating rod 6, 318 will move a greater distance in order to accommodate the wear. Since the position sensor 14 senses the distance moved by the operating rod 6, 318, the system can be programmed to illuminate the maintenance signal 216, or some other indicator, to indicate that excessive wear has occurred on the contacts 71, 72. The system can also modify its motion profile to allow for such incremental increases in stroke.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A current interrupter, comprising:

a current interrupting device having at least one movable contact;

an actuator coupled to the movable contact of the current interrupter;

a feedback sensor for monitoring movement of the actuator during an actuation cycle; and a control system coupled to the feedback sensor so as to receive information from the feedback sensor concerning the movement of the actuator during the actuation cycle and for directly controlling movement of the actuator during the actuation cycle based on the information from the feedback sensor.

2. The current interrupter of claim 1, further comprising:

means for storing a desired motion profile of the actuator; and means for comparing the movement of the actuator with the desired motion profile and controlling movement of the actuator based also on a comparison of the movement of the actuator with the desired motion profile.

3. The current interrupter of claim 2, further comprising:

a sensor for sensing a waveform of a voltage in a line to be interrupted and providing information concerning the voltage waveform to the control system;

wherein the control system controls the movement of the actuator based also on the information concerning the voltage waveform.

4. The current interrupter of claim 3, wherein the actuator is a voice coil actuator; the feedback sensor is a linear potentiometer; the current interrupting device is a vacuum interrupter; and further comprising a spring biasing the current interrupting device in a closed position and a latch for restraining the movement of the actuator.

5. The current interrupter of claim 1, further comprising:

a sensor for sensing a waveform of a voltage in a line to be switched and providing information concerning the voltage waveform to the control system;

wherein the control system controls the movement of the actuator based also on the information concerning the voltage waveform.

6. The current interrupter of claim 1, wherein the actuator is a voice coil actuator.

7. The current interrupter of claim 1, wherein the feedback sensor is a linear potentiometer.

8. The current interrupter of claim 1, wherein the current interrupting device is a vacuum interrupter.

9. The current interrupter of claim 1, further comprising a spring biasing the current interrupting device in a closed position.

10. The current interrupter of claim 1, further comprising a latch for restraining the movement of the actuator.

11. The current interrupter of claim 1, further comprising:

a sensor for sensing a waveform of a current in a line to be switched and providing information concerning the current waveform to the control system;

wherein the control system controls the movement of the actuator based also on the information concerning the current waveform.

12. The current interrupter of claim 1, wherein the feedback sensor comprises an optical encoder.

13. An interrupter for interrupting a current in a line, comprising:

a vacuum interrupter having at least one movable contact;

a voice coil actuator coupled to the movable contact of the current interrupting device for opening and closing the current interrupting device;

a control system for controlling actuation of the actuator during an actuation cycle;

means for inputting signals to the control system for opening and closing the current interrupting device;

a sensor for sensing a waveform of a voltage or current in the line to be interrupted during the actuation cycle; and a linear potentiometer for monitoring movement of the actuator during an actuation cycle;

wherein the control system is coupled to the sensor so as to receive information concerning the waveform from the sensor during the actuation cycle and to the linear potentiometer so as to receive information from the linear potentiometer concerning the movement of the actuator during the actuation cycle to directly control movement of the actuator during the actuation cycle based on the waveform information, the information from the linear potentiometer, and the input signals.

14. The interrupter of claim 13, further comprising means for storing a desired motion profile of the actuator; wherein the control system controls movement of the actuator based also on the desired motion profile.

15. The interrupter of claim 13, further comprising a spring biasing the current interrupting device in a closed position and a latch for restraining the movement of the actuator.

16. A method of controlling a current interrupter having an actuator, comprising the steps of:

monitoring movement of the actuator with a feedback sensor during an actuation cycle;

providing a result of the movement monitoring during the actuation cycle to a control system for controlling movement of the actuator; and directly controlling the movement of the actuator during the actuation cycle with the control system based on the result provided to the control system.

17. The method of claim 16, further comprising the steps of:

storing a desired motion profile of the actuator movement;

comparing the monitoring result with the desired motion profile; and further controlling the actuator movement based also on the comparing step.

18. The method of claim 16, further comprising the steps of:

sensing a voltage waveform in a line to be interrupted during an actuation cycle;

providing a result of the voltage waveform sensing to the control system during the actuation cycle and further controlling the movement of the actuator with the control system during the actuation cycle based also on the voltage waveform sensing result provided to the control system.

19. The method of claim 16, further comprising the steps of:

sensing a current waveform in a line to be interrupted; providing a result of the current waveform sensing to the control system and further controlling the movement of the actuator with the control system based also on the current waveform sensing result provided to the control system.

* * * * *